United States Patent [19]
Foley et al.

[11] Patent Number: 5,333,967
[45] Date of Patent: Aug. 2, 1994

[54] METHOD AND APPARATUS FOR REMOVING LABELS

[75] Inventors: Charles F. Foley; Harry P. Metheney, both of Charlotte; Bradley J. Tucker, Oakboro, all of N.C.

[73] Assignee: R&D of North Carolina Inc., Charlotte, N.C.

[21] Appl. No.: 21,043

[22] Filed: Feb. 23, 1993

[51] Int. Cl.$^5$ ............................................. B32B 31/00
[52] U.S. Cl. ................................... 401/139; 156/584; 401/137; 401/266
[58] Field of Search ................... 401/139, 137, 266; 156/584

[56] References Cited

U.S. PATENT DOCUMENTS

| | | | |
|---|---|---|---|
| 1,142,811 | 6/1915 | Griswold | 401/139 |
| 1,227,122 | 5/1917 | Eberhart | 40/306 |
| 1,407,955 | 2/1922 | Smalley | 401/139 |
| 1,890,314 | 12/1932 | Crane | 40/306 |
| 2,716,251 | 8/1955 | Pearce | 401/139 |
| 2,886,839 | 5/1959 | Leopoldi | 401/139 |
| 2,982,987 | 5/1961 | Knapp | 401/139 |
| 3,113,703 | 12/1963 | Rundle | 401/139 |
| 3,722,021 | 3/1973 | Brainerd et al. | 401/139 X |
| 4,079,030 | 3/1978 | Takanen et al. | 260/33.4 R |
| 4,128,452 | 12/1978 | Johnson et al. | 156/584 |
| 4,322,252 | 3/1982 | Plumb | 134/12 |
| 5,009,343 | 4/1991 | Pugatch | 401/139 |

FOREIGN PATENT DOCUMENTS

2921633 12/1980 Fed. Rep. of Germany ...... 401/139

Primary Examiner—Steven A. Bratlie
Attorney, Agent, or Firm—Clifton Ted Hunt

[57] ABSTRACT

Heptane has been found to be an effective and efficient solvent for pressure sensitive adhesives, and to be useful with an applicator for removing stickers, labels, tags, decals, etc. from substrates of paper, plastic, tile, leather, etc. applicator is used with a container holding a supply of solvent, preferably but not necessarily heptane, integrated with a spatulate-like tool extending from the applicator and beneath and beyond an opening in the container for receiving solvent from the container and applying the solvent to adhesive beneath a sticker to neutralize the adhesive preparatory to the tool being moved beneath the loosened sticker to remove it from the substrate.

8 Claims, 7 Drawing Sheets

METHOD AND APPARATUS FOR REMOVING LABELS

FIELD OF THE INVENTION

This invention relates to the expeditious removal of adhesively adhered stickers, labels, tags, tape, and the like, and more specifically to a method and apparatus for temporarily neutralizing the adhesive and expeditiously removing price tags, stickers, labels, tape, and the like which are adhesively adhered to a substrate without any damage to the substrate.

BACKGROUND OF THE INVENTION

The removal of price tags, stickers, tapes, labels, etc. has long been recognized as an aggravating and frustrating problem, and several patents have been issued for purported solutions to the problem. None of the purported solutions have heretofore been satisfactory.

The problem arises for consumers, for example, when giving a gift and it is desired to remove the price tag from the package or gift. The problem arises in businesses, for example, when it becomes necessary for a retailer to remove price tags from a plurality of packages of merchandise because of a change in the price of that merchandise, or when it becomes necessary for a manufacturer or dealer to remove stickers or labels from a plurality of packages returned by a retailer.

The nature of the problem is that it is difficult to remove a pressure sensitive sticker without undesirably disturbing the substrate; and this problem, for the consumer, was intentionally developed at great cost to the sticker manufacturers to insure their customers, the retail trade, that their in-house applied price tags could not be removed by unscrupulous persons, without notice.

THE PRIOR ART

One purported solution to the problem of removing stickers is disclosed in U.S. Pat. No. 4,306,989 issued Dec. 22, 1981 to Motsenbocker for COMPOSITION FOR RELEASING ADHESIVES FROM A SURFACE. Motsenbocker teaches a chemical composition which acts as a solvent of the adhesive that holds a label to a substrate. Motsenbocker's chemical composition contains a carrier, such as kerosene, that undesirably spots a paper substrate after the label has been removed and also leaves an undesirable oil like film on the substrae. Another objection to the Motsenbocker invention is that it is harmful to styrene plastic. Motsenbocker does not provide any kind of an applicator for applying the chemical composition or any form of tool for removing the label.

U.S. Pat. No. 3,107,425, issued Oct. 22, 1963 to Rentz for CUTTING INSTRUMENT, discloses a device for cutting a sheet paper into two cleanly defined portions without damage to the paper being cut and without damage to a sheet of paper adjacent the sheet being cut. Rentz teaches the use of a cutting element with a sharp cutting tip or point that is lubricated with a wetting solution, such as water, while in use. The wetting agent softens and the cutting element weakens the area of the paper through which the cutting element is drawn, enabling the paper to be pulled apart along a clean line.

U.S. Pat. No. 3,818,592, issued Jun. 25, 1974 to Himeno for KNIFE FOR PEELING OFF STICKERS AND THE LIKE, and U.S. Pat. No. 4,114,267, issued Sept. 19, 1978 to Marchio for PRICE LABEL REMOVAL, each discloses a cutting element specifically designed to remove adhesively connected material without the use of a wetting agent or solvent.

U.S. Pat. No. 4,128,452, issued Dec. 5, 1978 to Johnson, et al. for APPARATUS FOR SEPARATING ADHESIVELY CONNECTED MATERIAL, discloses a blade with a wedge-shaped periphery that is retained in a sheath having inner surfaces of absorbent material. A lubricating substance, such as a silicone fluid is evenly distributed throughout the absorbent material. The lubricant is evenly applied to the blade when the blade is removed from the sheath, permitting nearly frictionless contact between the blade and the material to be separated.

SUMMARY OF THE INVENTION

The present invention provides a solvent for TEMPORARILY neutralizing the adhesive adhering qualities of pressure sensitive stickers, labels, tags, decals, electrician's tape, SCOTCH tape, or the like until they can be removed from a substrate (SCOTCH is a trademark of Minnesota Mining Manufacturing Company, St. Paul, Minn.). The adhesively adhered items which may be removed from a substrate accordance with this invention, such as those mentioned above, are hereinafter referred to as stickers.

An applicator is provided for applying solvent to the adhesive beneath the sticker to temporarily neutralize the adhesive and for removing the sticker from the substrate while the adhesive is neutralized.

One embodiment of the applicator includes a container of solvent and a housing for the container. The housing comprises a preferably flexible band releasably supported on the container, with the applicator extending from the band and beyond the container to first serve as a retainer of solvent received from container, then as a dispensor of the solvent to the adhesive beneath a sticker, and then as a lifting device or spatulate to be inserted between the sticker and the substrate for removal of the sticker.

A second embodiment of the applicator is a replaceable cap for the outlet of the solvent container. The cap is formed with a permanent outlet or hole and with an applicator extending beyond the outlet. The applicator first functions to retain a small amount of solvent received from the container, then as a dispensor of the solvent to the adhesive beneath a sticker, after which the applicator is inserted between the sticker and a substrate to remove the sticker.

The preferred solvent is heptane, $CH_3 (CH_2)_5 CH_3$, which is commonly used as a rubber cement thinner, but has not heretofore been used to neutralize adhesive for the removal of pressure sensitive stickers.

Stickers are quickly and easily removed by the method and apparatus of this invention without damage to the substrate and without damage to the sticker. The preferred solvent quickly evaporates, and, after its evaporation, the adhesive becomes reactivated and the sticker may be reapplied to the same, or a different substrate, when and if desired.

DETAILED DESCRIPTION OF THE INVENTION

Referring to the embodiment of FIGS. 1-9 in the drawings, the numeral 10 broadly designates an applicator for removing stickers that are adhesively adhered to any kind of substrate, such as paper, plastic, glass, tile, drywall (painted or unpainted), etcetera.

The applicator 10 is used with a preferably flexible container 11 (FIG. 5), holding a supply of solvent, the operative end of the applicator being shaped in an arcuate configuration to receive the solvent from the container 11.

Figure 1:
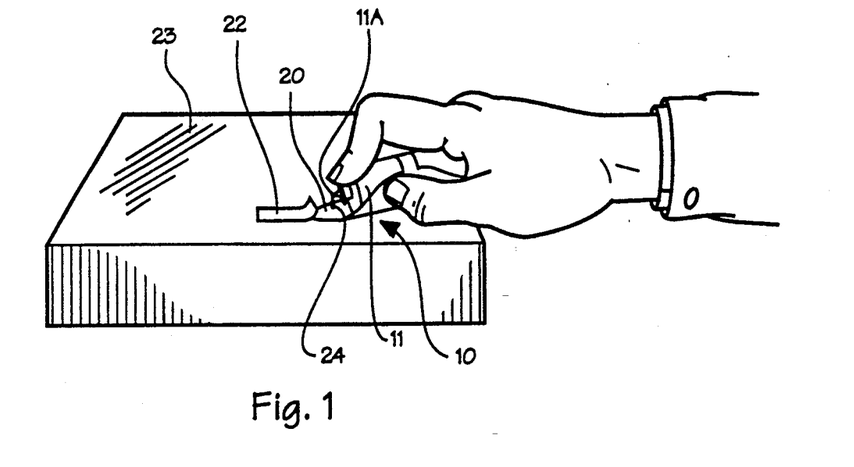
FIG. 1 is an environmental view, in perspective, showing a first embodiment of the applicator of this invention being used to remove a sticker from a substrate after the applicator has been used to deliver solvent to the adhesive beneath the sticker, whereby the adhesive that had adhered the sticker to the substrate is temporarily neutralized.
Figure 2:
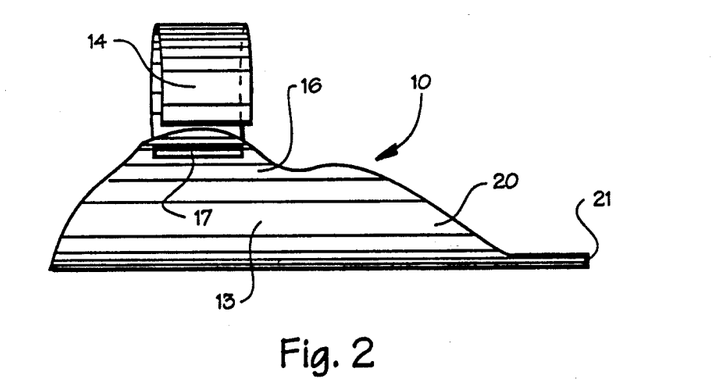
FIG. 2 is a side view of the applicator used in the first embodiment of the invention, showing the friction tab disengaged from one side of the applicator.
Figure 3:
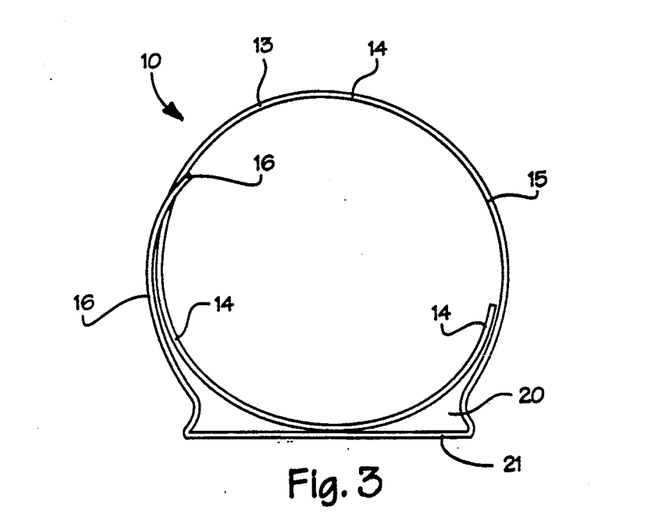
FIG. 3 is an enlarged end view of the applicator, looking at the right end of FIG. 2 and showing the friction tab in its operative position.
Figure 4:
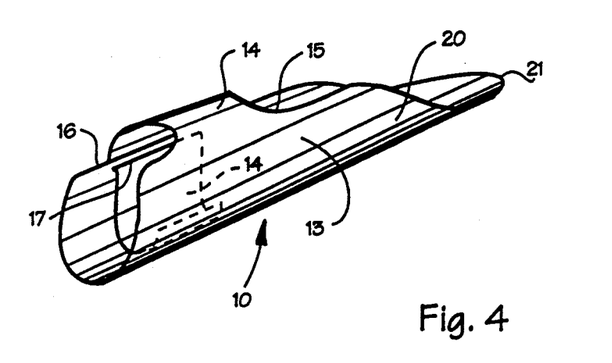
FIG. 4 is a perspective view of the applicator with the friction tab in the operative position shown in FIG. 3, and looking at the end opposite that shown in FIG. 3.
Figure 5:
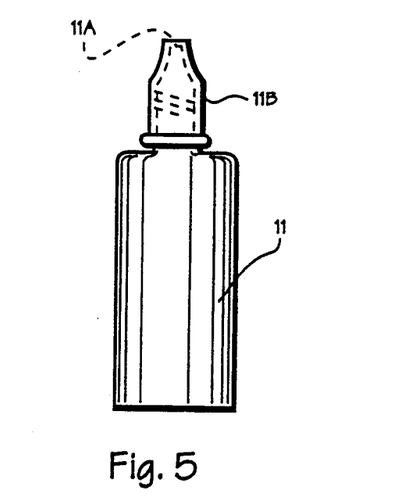
FIG. 5 is a side view of a solvent-holding container to be used with the applicator shown in FIGS. 2-4.
Figure 6:
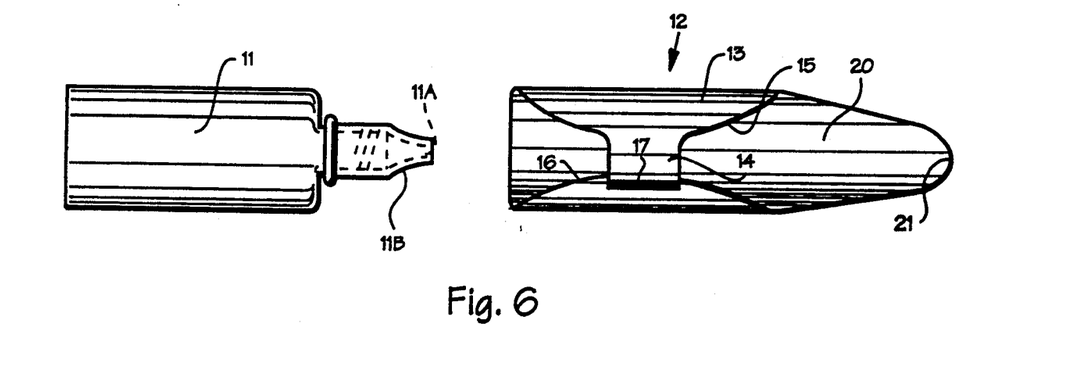
FIG. 6 is an exploded side elevation of the container and applicator to be assembled in accordance with the invention.
Figure 7:
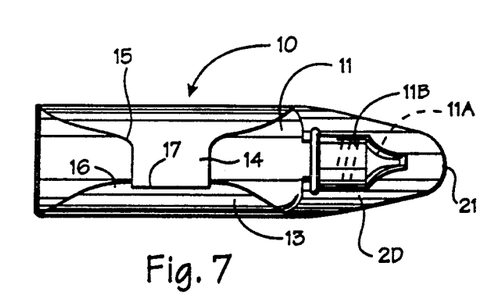
FIG. 7 is a side view of the assembled container and applicator.
Figure 8:
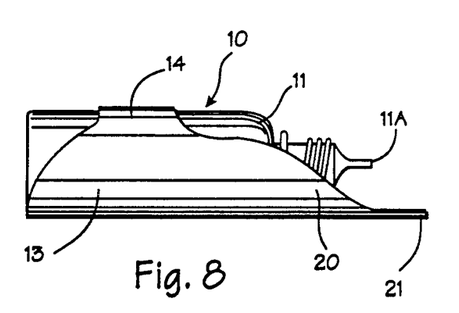
FIG. 8 is a side view of the assembled container and applicator rotated ninety degrees from the position shown in FIG. 7.
Figure 9:
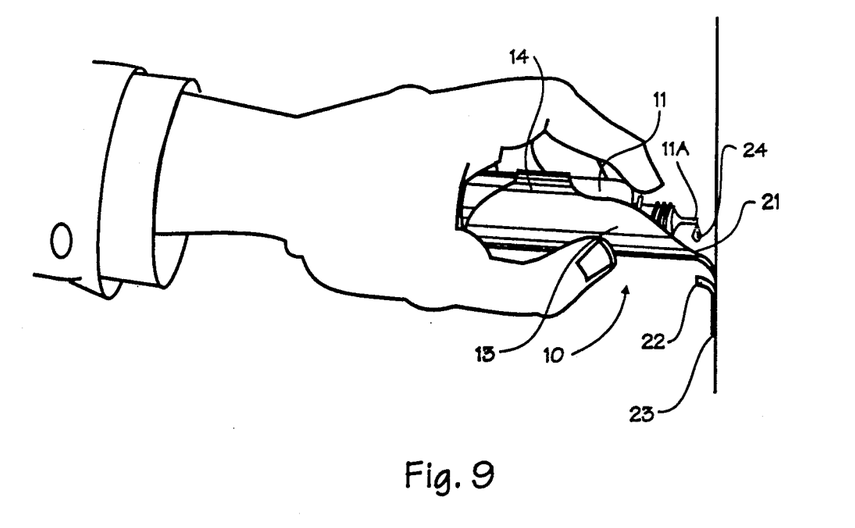
FIG. 9 is an environmental view similar to FIG. 1, but showing the applicator and solvent used to remove a sticker from a vertical substrate.

In the embodiment of FIGS. 1-9, the applicator 10 is preferably formed from flexible plastic and includes an arcuate band 13 with a friction tab 14 extending from one edge portion 15 (FIGS. 4 and 6) of the band 13 and around the container 11 (FIGS. 7 and 8). The opposing edge portion 16 (FIG. 2) of the band 13 has a slot 17 which snugly receives the friction tab 14. The friction tab 14 extends beyond the slot 17 into the space between the container 11 and the band 13 of the applicator 10, and functions to frictionally retain the container 11 in the band when the applicator 10 is in use (FIGS. 1 and 9).

The operative end of the applicator is a spatulate-like tool 20 extending forwardly from the band 13 of the applicator 10, and beyond the outlet 11A of the container 11. The tool 20 is of arcuate configuration in cross section as it leaves the and 13 and gradually flattens to a planar configuration at its free end 21. The end 21 of the tool 20 is thin to easily fit between a loosened sticker 22 and a substrate 23, as shown in FIGS. 1 and 9.

The sticker is preferably loosened by neutralizing the adhesive beneath the sticker with the preferred solvent, heptane, $CH_3(CH_2)_5 CH_3$. Heptane is commonly used as a rubber cement thinner but has been surprisingly found to quickly and effectively temporarily neutralize pressure sensitive adhesives, and to then quickly evaporate without damage to the substrate or the sticker.

Other solvents, such as compositions containing hexane ($CH_3(CH_2)_4 CH_3$), are effective in the practice of the invention, and it is intended that all effective solvents be included in the generic term "solvent" as used in this specification and the accompanying claims.

In use, the container cap 11B (FIGS. 5, 6, and 7) is removed to expose the open tip 11A (FIG. 8) of the container 11, and a small amount of solvent 24 is allowed to pass from the open container tip 11A to the tool 20. A small amount of solvent remains on the tool 20, as by surface tension, until the free end 21 of the tool 20 is placed against the sticker 22 to be removed from the substrate 23, as shown in FIGS. 1 and 9.

The solvent penetrates a porous sticker to contact and temporarily neutralize the adhesive beneath the sticker. If the sticker to be removed is non-porous, the tool 20 and its free end 21 cooperate with the solvent to loosen the sticker by dispensing some solvent onto the tool; placing the free end 21 of the tool 20 against one edge of a sticker, and delivering the solvent to that one edge of the sticker.

The solvent contacts and neutralizes the adhesive at said one edge of the sticker and continues to progressively neutralize the adhesive beneath the sticker as the solvent is released from the tool while the free end 21 of the tool is moved beneath the non-porous sticker toward the edge opposite said one edge. When the free end 21 of the tool has moved beyond the opposite edge of the sticker, the loosened sticker rests on and is supported by the tool. The tool is large enough to hold several successively removed stickers. This feature provides an added advantage to the utility of the applicator 10 when it is used to remove a large number of stickers in a short time.

Another advantage of the applicator 10 is that its preferably flexible tool 20 readily conforms to a curved shape, such as a round bottle, supporting a sticker to be removed.

Heptane neutralizes the adhesive in no more than five seconds, and the free end 21 of the tool 20 is then moved quickly beneath the sticker to lift it. After about thirty seconds, the heptane evaporates from the substrate without a trace, and the adhesive on the sticker is restored for reuse, if desired.

Figure 10:
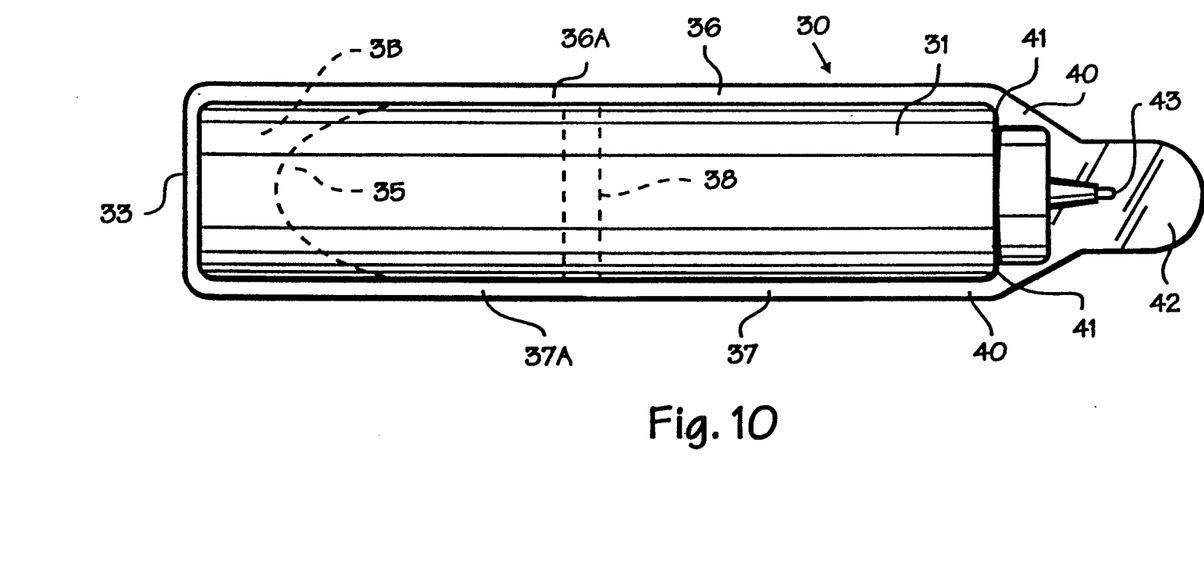
FIG. 10 is a side view of a second embodiment of the assembled container and applicator.
Figure 11:
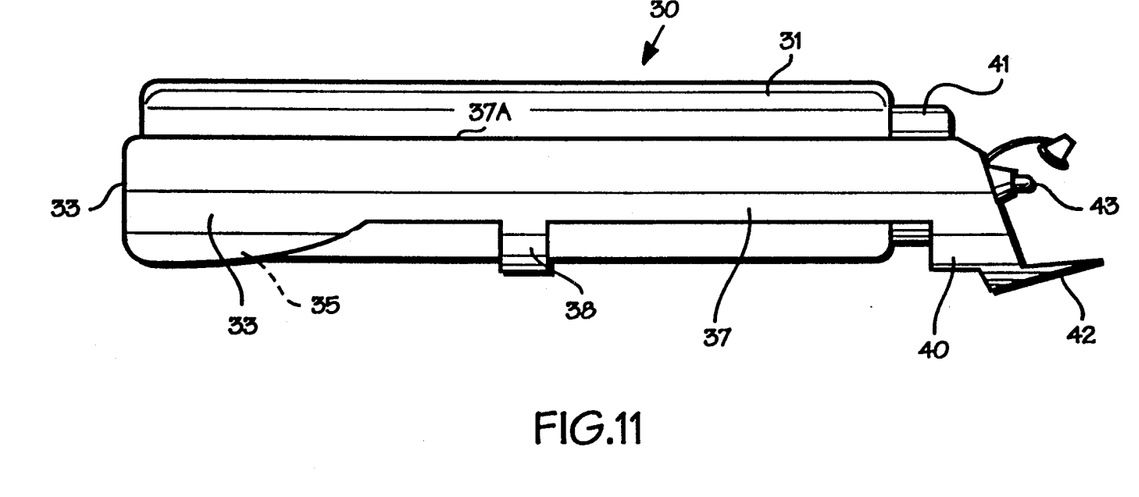
FIG. 11 is a side view of the assembled container and applicator shown in FIG. 10, but rotated ninety degrees.

A second embodiment of the invention is shown in FIGS. 10 and 11. There, an applicator for removing adhesively adhered stickers is broadly indicated at 30. The applicator 30 is used with a container 31 holding a supply of solvent, such as heptane, and the operative end of the applicator 30 is shaped in an arcuate configuration to receive the solvent from the container.

The operative end of the applicator 30 is a spatulate-like tool 42 that is formed from stiff but resilient plastic.

Spaced rearwardly from the tool 42 is a semi-circular base 33 that fits over one end of the container 31.

The base 33 extends upwardly a short distance to a point 35 where the base 33 merges with opposed side walls 36 and 37 that extend from the base 33 to the top of the container. The mid portions of the side walls 36 and 37 are joined by a strap 38 extending around the same side of the container 31 as the semicircular base 34.

The proximal edges 36A and 37A of the side walls 36 and 37 of the applicator may be flexed apart to receive the container 31 and then allowed to relax to grip the container in use. Similarly, the proximal edges 36A and 37A may be flexed apart to remove an empty container from the spatulate and to replace it with another container of solvent.

The ends of the side walls 36,37 remote from the base 33 merge with a semi-circular collar 40 that extends half way round the top 41 of the container 31. The collar 40 merges inwardly into overlying relation with the top 41 of the container and presses the container toward the base 33 because the side walls 36, 37 are slightly shorter than the length of the container 11. Thus, the container will seat within the body portion of the applicator with a pressure fit.

A spatulate-like tool 42 extends forwardly from the collar 40 and beyond the tip 43 of the container 31. The tool 42 includes a thin free end 44 like the free end 21 on the spatulate-like tool 20. The applicator 30 functions to remove stickers in the same manner as has been described for the applicator 10.

Figure 12:
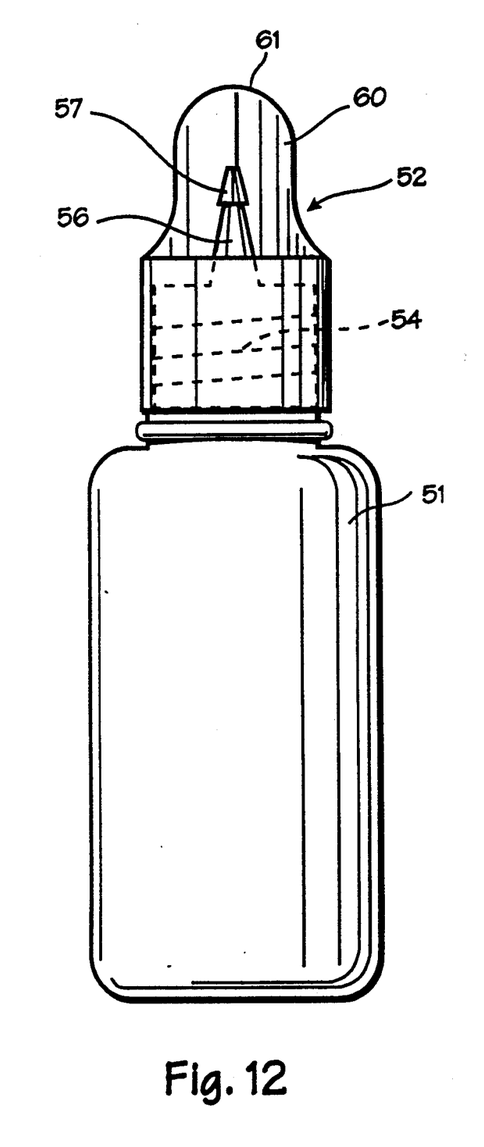
FIG. 12 is a side view of a third embodiment.
Figure 13:
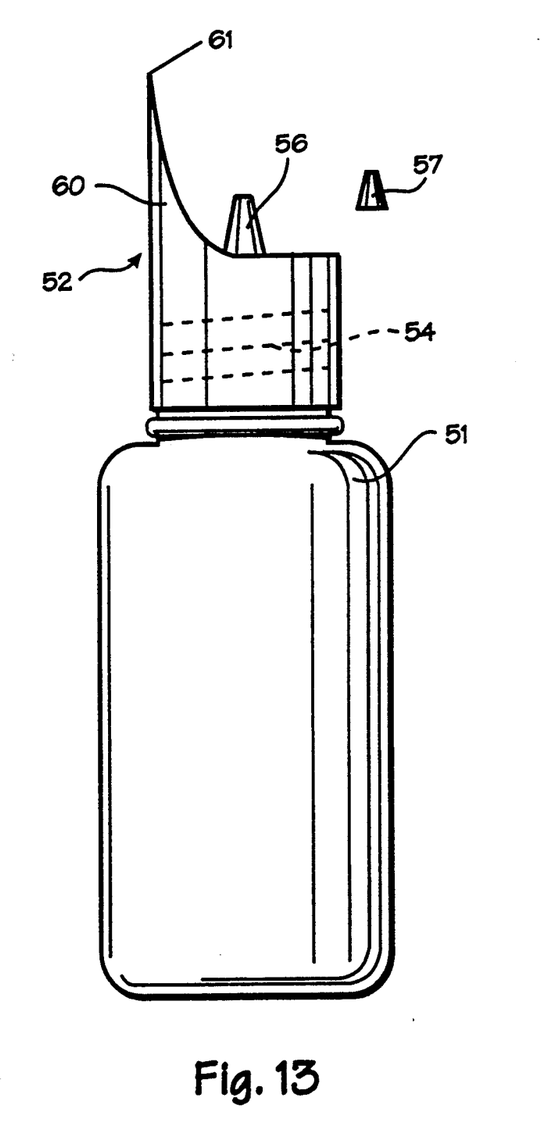
FIG. 13 is a side view of the assembled container and applicator shown in FIG. 12, but rotated ninety degrees, and with the closure cap removed from the container and shown to the right of the container.
Figure 14:
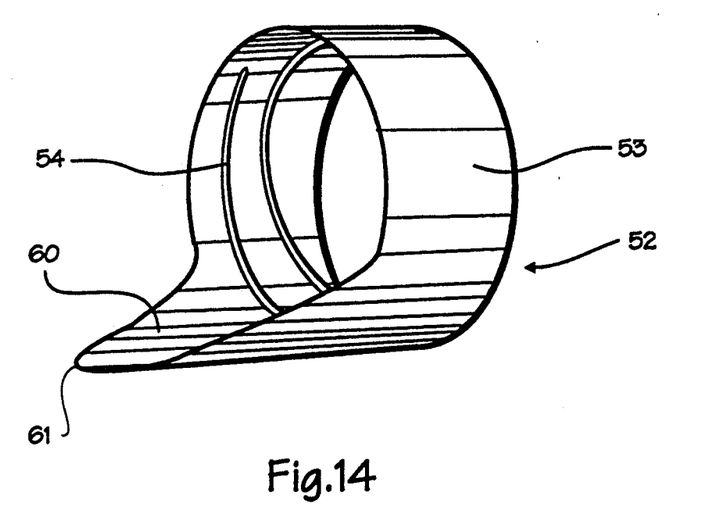
FIG. 14 is a perspective view looking at the applicator that has been removed from the container shown in FIGS. 12 and 13.

A third embodiment of the invention is shown in FIGS. 12-15. There, an applicator 52 is used with a container 51. As best seen in FIG. 14, a collar or body portion 53 of the applicator 52 is circular and is interiorly threaded as at 54. The interiorly threaded collar 53 of the applicator 52 fits over the correspondingly threaded neck 55 of the container 51. A hollow dispensing spout 56 extends outwardly from the neck 55 and is closable, when not in use, by a friction fit closure cover 57 (FIG. 12). In FIG. 13, the cover 57 has been removed from the container 51 and is separately shown beside the container.

A spatulate-like tool 60 is formed integrally with the body portion 53 of the applicator 52, and extends outwardly from the container 51 when the applicator 52 and container 51 are assembled. The tool 60 is of arcuate configuration at its merger with the body portion 53, but the tool gradually flattens to a planar configuration as it extends outwardly from the body potion to its free end 61. The free end 61 of the tool 60 is flat and thin to easily fit between a sticker and a substrate in use.

Figure 15:
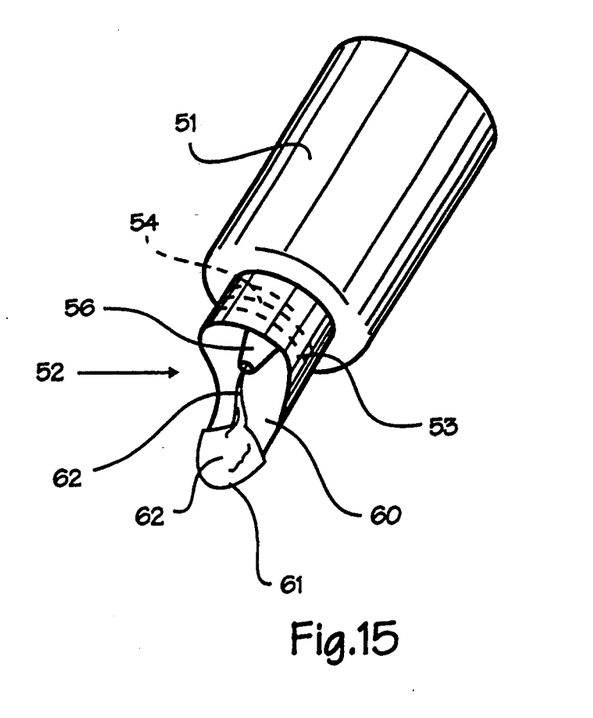
FIG. 15 is a perspective view of the assembled container and applicator shown in FIG. 12 in operative position with solvent being dispensed from the container to the applicator and retained on the applicator for delivery to adhesive beneath an impervious sticker.

In FIG. 15, a drop of solvent 62 is shown falling between the spout 56 and the underling tool 60, and a small amount of solvent 62 is shown clinging to the upper surface of the tool 60 as it does by surface tension when the free end of the tool is brought against an edge of a non-porous or impervious sticker preparatory to its removal, as in FIG. 1.

Although specific terms have been used in describing the invention, they have been used in a generic and descriptive sense only and not for the purpose of limitation.

We claim:

1. A method of removing a sticker that is adhered by adhesive to a substrate, said method comprising the steps of:
   (a) providing a supply of heptane;
   (b) applying the heptane to the adhesive, whereby the heptane neutralizes the adhesive to loosen the sticker; and
   (c) removing the sticker.

2. A method of removing a sticker that is adhered by adhesive to a substrate, said method comprising the steps of:
   (a) providing a supply of a composition containing hexane;
   (b) applying the composition containing hexane to the adhesive, whereby the hexane neutralizes the adhesive to loosen the sticker; and
   (c) removing the sticker.

3. Apparatus for the removal of stickers adhered by adhesive to a substrate, said apparatus comprising an applicator, a spatulate-like tool at one end of the applicator, a container, means for integrating the applicator and the container for operative use, the container having an open tip during operative use, the spatulate-like tool including a free end that extends beneath and beyond the container's open tip when the applicator and container are integrated for operative use, the free end of the spatulate-like tool being thin, flexible and flat, and a liquid solvent for the adhesive, the liquid solvent being housed within the container, whereby a small amount of solvent may be dispensed from the open container tip to the free end of the spatulate-like tool and remain on the free end of the spatulate-like tool as by surface tension until the free end of the spatulate-like tool is placed against a sticker to be removed from a substrate.

4. Apparatus according to claim 3 wherein the solvent is heptane.

5. Apparatus according to claim 3 wherein the solvent is a composition containing hexane.

6. Apparatus according to claim 3 wherein the means for integrating the container and the spatulate-like tool comprises a friction tab extending from one edge of the applicator, the opposing edge portion of the applicator having a slot to receive the friction tab, and the friction tab extending partially around the container, through the slot and between the container and the applicator to frictionally retain the container in the applicator.

7. Apparatus according to claim 3 wherein the means for integrating the container and the spatulate-like tool comprises a semi-circular base at one end of the applicator, a semi-circular collar at the opposite end of the applicator, side walls extending between the semi-circular base and the semi-circular collar, and the side walls being slightly shorter than the container, whereby the side walls may be flexed apart to receive a container of solvent and then allowed to relax to grip the container in use.

8. Apparatus according to claim 3 wherein the means for integrating the container and the spatulate-like tool comprises an outwardly threaded neck on the container and an interiorly threaded circular body portion on the applicator to threadably engage the neck of the container.

* * * * *